United States Patent
Huang

(10) Patent No.: US 10,508,888 B1
(45) Date of Patent: Dec. 17, 2019

(54) REINFORCED FABRIC

(71) Applicant: Po-Shih Huang, Taichung (TW)

(72) Inventor: Po-Shih Huang, Taichung (TW)

( * ) Notice: Subject to any disclaimer, the term of this patent is extended or adjusted under 35 U.S.C. 154(b) by 0 days.

(21) Appl. No.: 16/198,794

(22) Filed: Nov. 22, 2018

(51) Int. Cl.
*F41H 5/04* (2006.01)
*B32B 5/26* (2006.01)

(52) U.S. Cl.
CPC .............. *F41H 5/0485* (2013.01); *B32B 5/26* (2013.01); *F41H 5/0464* (2013.01); *B32B 2571/02* (2013.01)

(58) Field of Classification Search
None
See application file for complete search history.

(56) References Cited

U.S. PATENT DOCUMENTS

| | | | | |
|---|---|---|---|---|
| 5,926,842 A * | 7/1999 | Price | ..................... | F41H 5/0478 2/2.5 |
| 6,651,543 B2 * | 11/2003 | Park | ......................... | F41H 1/02 89/36.02 |
| 6,786,126 B2 * | 9/2004 | Sargent | ................. | F41H 5/0485 2/2.5 |
| 2010/0313321 A1 * | 12/2010 | Carlson | ..................... | F41H 1/02 2/2.5 |
| 2015/0345910 A1 * | 12/2015 | Searle | ...................... | A41D 1/04 2/2.5 |

* cited by examiner

*Primary Examiner* — Stephen Johnson
(74) *Attorney, Agent, or Firm* — Leong C. Lei

(57) ABSTRACT

A reinforced fabric is used in the making of clothes and bags and mainly includes a bulletproof cloth configured between a protective cloth attached to an inner lining cloth and an outer lining cloth opposite to the inner lining cloth, which can not only block the impact of bullets through the bulletproof cloth but facilitate blocking any slashing and stabbing of weapons with the high density of the protective cloth. The present invention can not only protect a wearer's personal safety but improve a user's wearing comfort.

9 Claims, 4 Drawing Sheets

REINFORCED FABRIC

(a) TECHNICAL FIELD OF THE INVENTION

The present invention relates to a reinforced fabric, and more particularly to a reinforced fabric for clothes and bags.

(b) DESCRIPTION OF THE PRIOR ART

Protective clothing is not only used exclusively by police officers, security personnel or riot personnel. In view of the use of sharp objects everywhere in daily life, especially the use of knives such as the utility knife and scissors that are often used in art work, the forks and cutlery used for daily eating, or the kitchen knives used for cooking, which are more ubiquitous in daily life, the general public also has a great chance to be exposed to the threat of sharp objects in their daily lives. Furthermore, if the knives and tools are used by the unscrupulous people for misconduct, it is a great threat to the personal safety of the people. Therefore, people's requirements for the protective performance of fabric used in daily necessities such as clothes and bags are even higher so as to avoid endangering life safety when stabbed by sharp objects or attacked by unscrupulous people.

The fabric currently popularly used in the production of clothes and bags is made of cotton, silk, fur or chemical fiber, but these materials cannot effectively defend sharp cut and puncture because of worse strength and lower abrasion resistance thereof; they cannot play a protective role in the event of a dangerous situation such as knife cutting and knife stab, causing wearers to be vulnerable to flesh and blood, and even possibly endangering life. In addition, general protective fabrics are higher in hardness such that they are uncomfortable for wearing and may affect daily actions or work efficiency, and instead, reduce the willingness of the people to wear such that people cannot be protected in time when danger happens. Furthermore, most stab-resistant products do not have bulletproof features because stab-resistant and bulletproof principles are very much different. At the same time, general bulletproof clothes, such as armored outerwear, explosion-proof clothing or bulletproof vests, are made by directly setting a metal layer between inner lining cloth and the outer lining cloth; although the metal material layer has certain protective functions, it is cumbersome upon wearing such that it is unable to be worn for a long time.

SUMMARY OF THE INVENTION

One object of the present invention is to provide a reinforced fabric, used in the making of clothes or bags, capable of effectively blocking the slashing and stabbing of a weapon, having a bulletproof function, and improving wearing comfort.

To achieve the object mentioned above, the present invention proposes a reinforced fabric, used in the making of clothes and bags and including an inner lining cloth, protective cloth configured on one side of the inner lining cloth, outer lining cloth configured on one side of the protective cloth opposite to the inner lining cloth, and bulletproof cloth configured between the protective cloth and outer lining cloth, wherein an accommodation space just for the configuration of the bulletproof cloth is formed between the protective cloth and outer lining cloth. Therefore, the present invention can not only block the impact of bullets through the bulletproof cloth, but effectively block the slashing and stabbing of weapons with the high density of the protective cloth, preventing the inner lining cloth from being damaged to hurt wearers, and more capable of effectively blocking the attack of guns or weapons. In addition, the inner and outer lining cloths also provide better softness and touch, further increasing the wearing comfort.

DETAILED DESCRIPTION OF THE PREFERRED EMBODIMENTS

Figure 1:
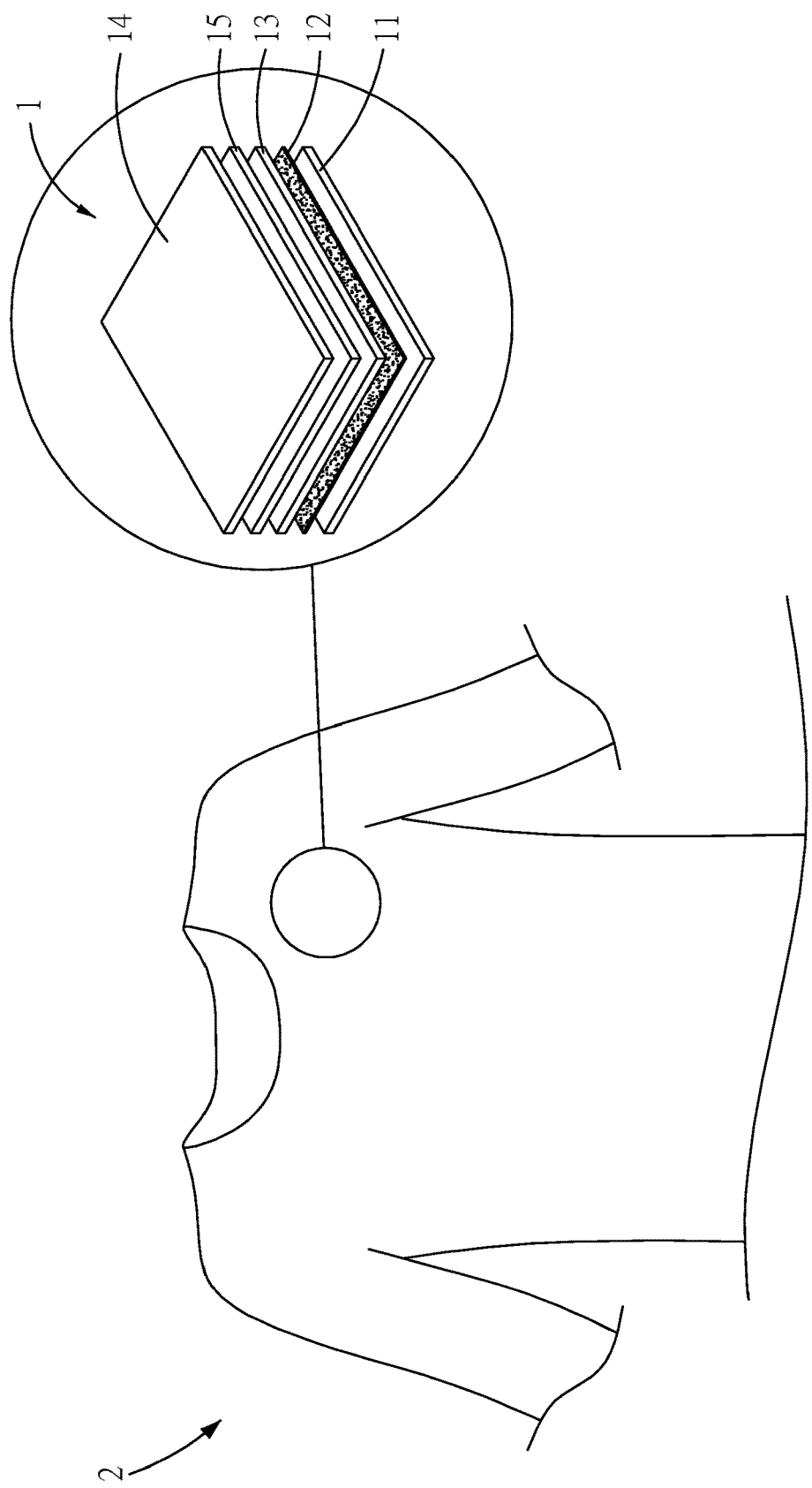
FIG. 1 is a schematic view of a first preferred embodiment of the present invention.
Figure 2:
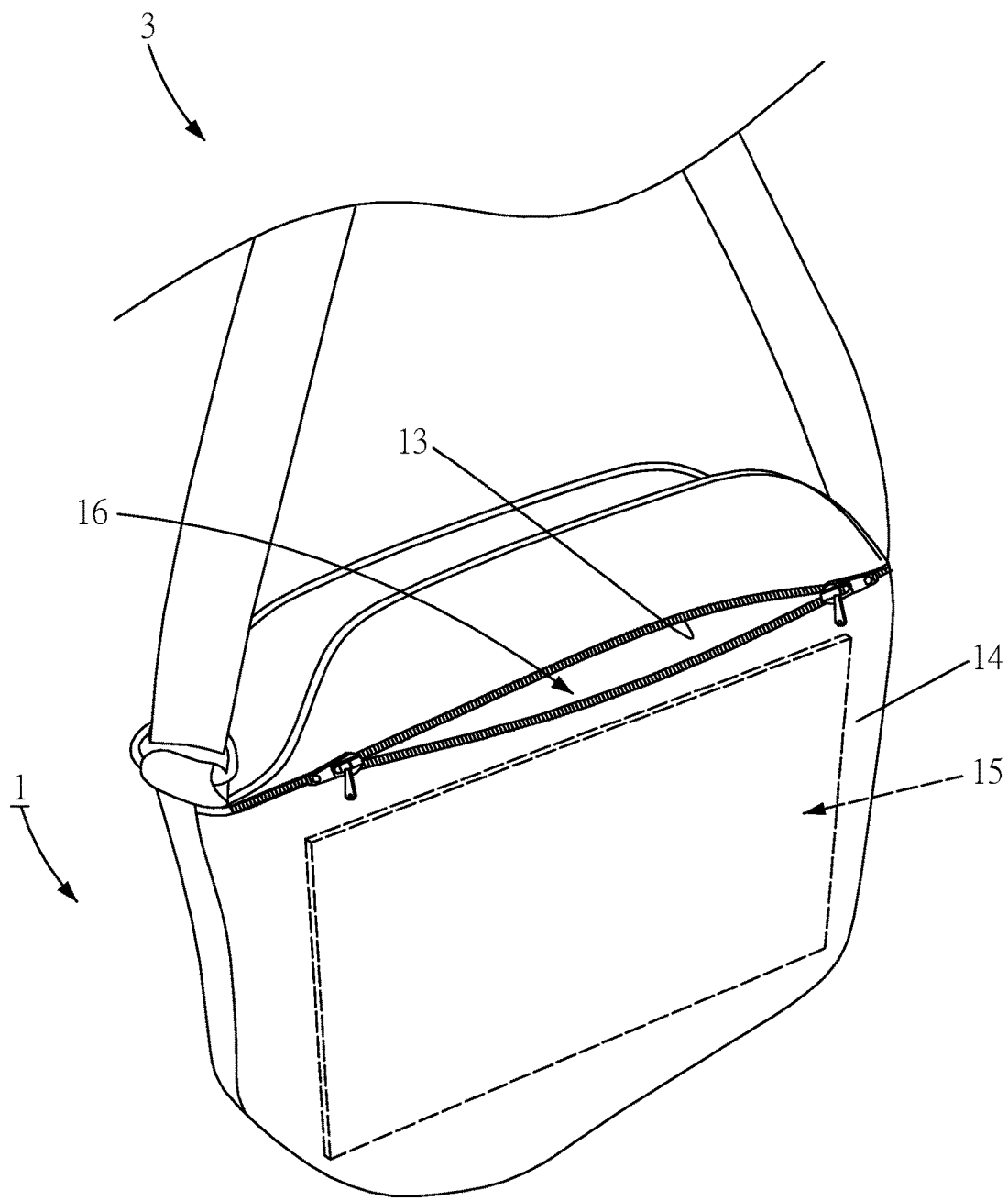
FIG. 2 is a perspective view of the first embodiment of the present invention in a use state.

Referring to FIG. 1, a reinforced cloth 1 of the present invention, in a first preferred embodiment, includes an inner lining cloth 11, protective cloth 13 attached to one side of the inner lining cloth 11 by an adhering glue 12, outer lining cloth 14 configured on one side of the protective cloth 13 opposite to the inner lining cloth 11, and bulletproof cloth 15 configured between the protective cloth 13 and outer lining cloth 14, where an accommodation space is formed between the protective cloth 13 and outer lining cloth 14, allowing the bulletproof cloth 15 to be configured inside it, where the density of the protective cloth 13 is equal to or larger than 13 g/cm$^3$ in order to improve the effect of the protective cloth 13 against the action of slashing and stabbing. Furthermore, in the embodiment, the reinforced fabric 1 can be applied to make clothes 2 shown in FIG. 1 or a bag 2 shown in FIG. 2; the protective cloth 13 in combination with the bulletproof cloth 15 is used whether it is the clothes 2 shown in FIG. 1 or the bag 3 shown in FIG. 2. For convenient description, only the clothes 2 shown in FIG. 1 is taken as an example to describe below.

Referring to FIG. 1 again, in the embodiment, because the inner lining cloth 1 is equivalent to the place where the clothes 2 are in contact with the skin, the inner lining cloth 11 may be made of soft cloth material to promote wearing comfort, the skin-friendliness, softness and comfort of the soft cloth material being used to enhance the wearing comfort. In addition, the bulletproof cloth 15, is preferably formed by combining 13 layers of hard Kevlar material with 17 layers of soft Kevlar material, or by combining 17 layers of hard Kevlar material with 10 layers of soft Kevlar material.

Referring to FIG. 1 again, in the embodiment, the reinforced fabric 1 is integrally made into personal daily necessities such as the clothes 2 or bag 3, which allow wearers to have more skin-friendly and comfortable touch upon wearing, and high density of the protective cloth 13 is used to allow it not to be scratched easily to resist the attack of any weapon for the first time when wearers are stabbed with a sharp weapon. Finally, with the protection of the bulletproof cloth 15 configured between the outer lining cloth 14 and protective cloth 13, the penetrating impact of a bullet can be effectively blocked, thereby achieving the personal safety of wearers.

Figure 3:
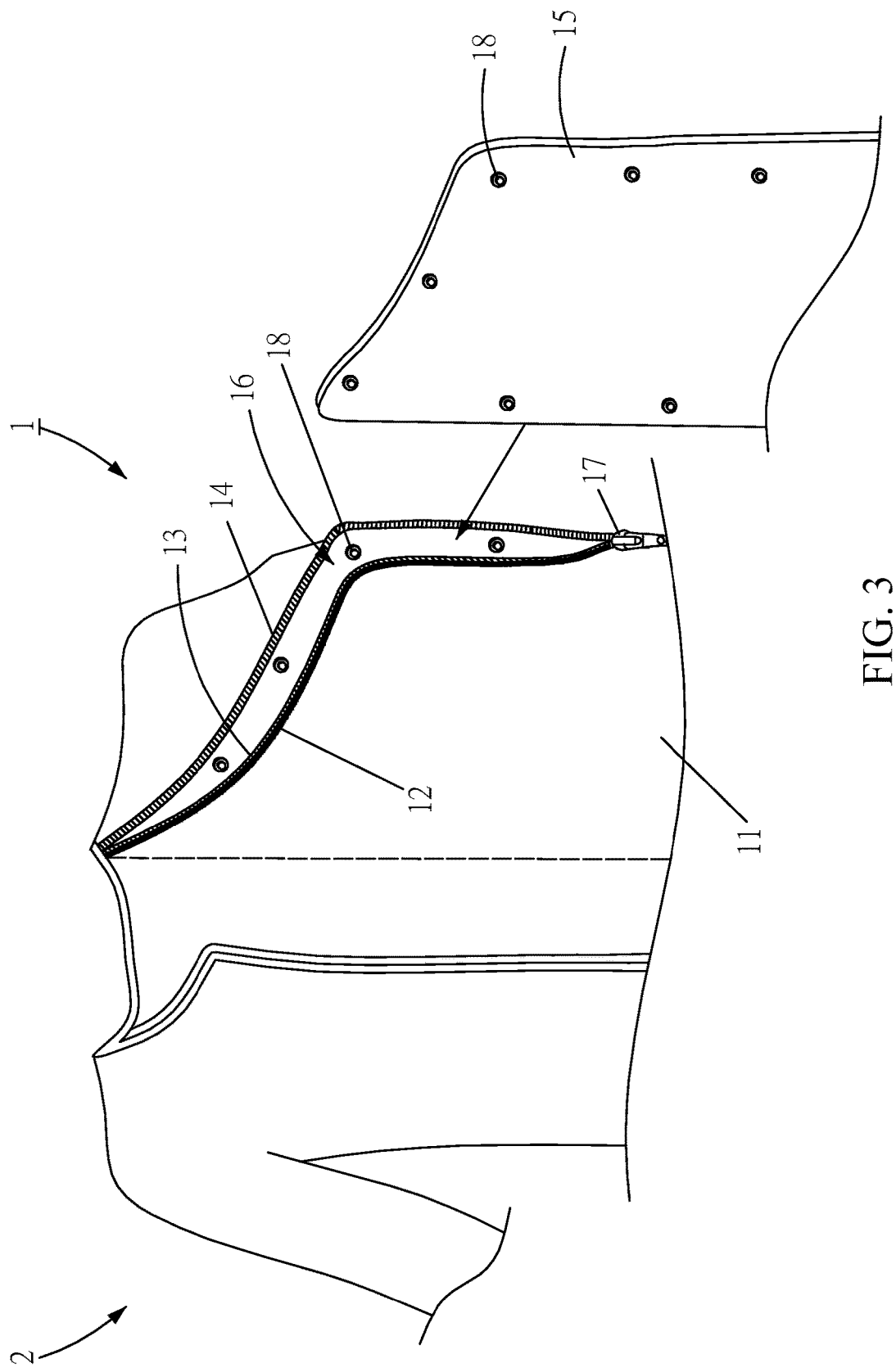
FIG. 3 is a perspective view of a second preferred embodiment of the present invention.
Figure 4:
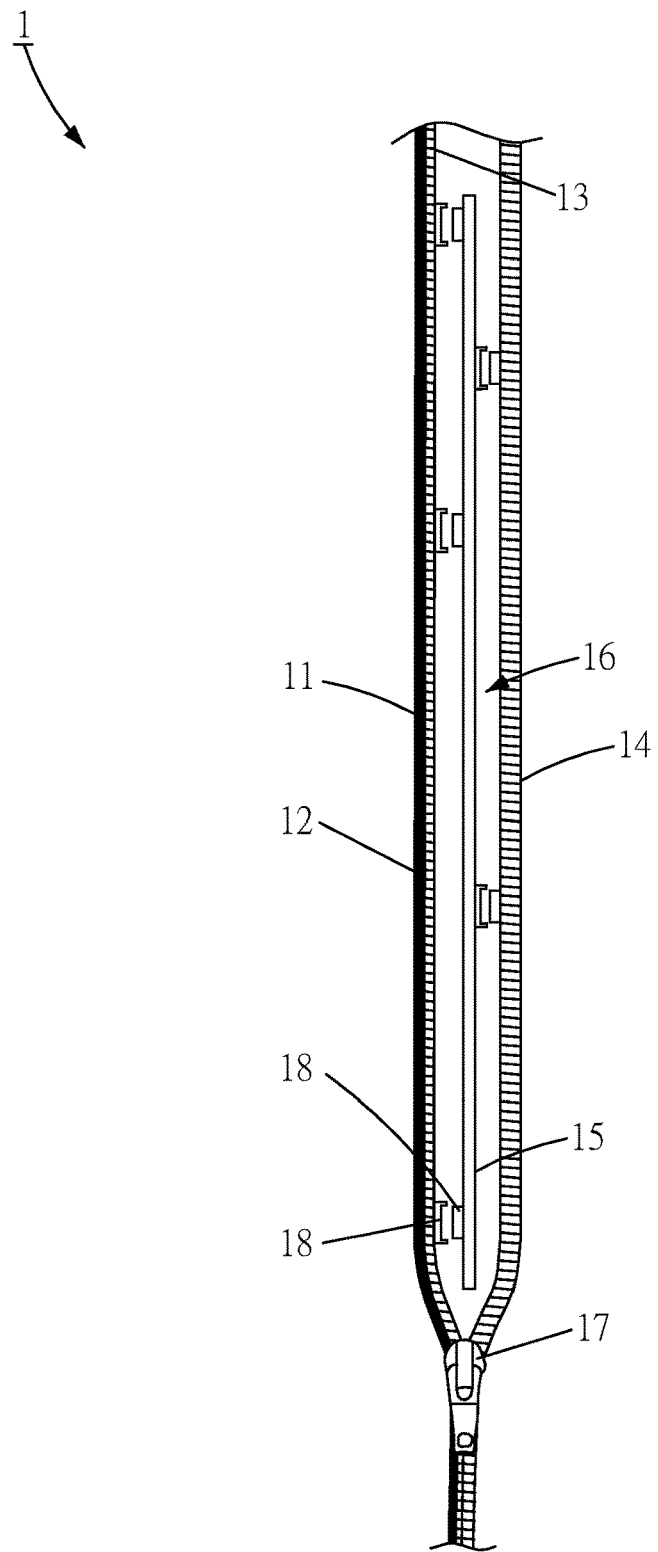
FIG. 4 is a partly cross-sectional view of the second embodiment of the present invention.

Referring to FIGS. 3 and 4, in a second preferred embodiment, a reinforced fabric of the present invention still includes components mentioned above in the first embodiment, the present embodiment is characterized in that the peripheries of the inner lining cloth 11 and outer lining cloth 14 are configured with an openable and closable fixing element 17, allowing the bulletproof cloth 15 to be taken out of or placed in the accommodation space 16. In addition, the positions of the bulletproof cloth 15 and protective cloth 13 corresponding to each other are respectively configured with a buckling piece 18 so as to allow the bulletproof cloth 15 and protective cloth 13 to be in combination with each other and thus positioned. Of course, the positions of the bulletproof cloth 15 and outer lining cloth 14 corresponding to each other may also respectively be configured with a buckling piece 18 so as to allow the bulletproof cloth 15 and outer lining cloth 13 to be in combination with each other and thus positioned, thereby more stably positioning the bulletproof cloth 14 without slip offset, where the fixing element 17 and buckling piece 18 may respectively be a zipper, Velcro tap or snap fastener depending on requirements.

Still continuing foregoing, because the peripheries of the inner lining cloth 11 and outer lining cloth 14 are configured with the fixing element 17, and the positions of the bulletproof cloth 15 and protective cloth 13 corresponding to each and the positions of the bulletproof cloth 15 and outer lining cloth 14 corresponding to each other are respectively configured the buckling piece 18, a wearer may disengage the inner lining cloth 11 from outer lining cloth 14 by actuating the fixing element 17, and at the same time, the corresponding buckling pieces between the bulletproof cloth 15 and protective cloth 13 and between the bulletproof cloth 15 and outer lining cloth 14 are separated from each other to release the bulletproof cloth 15. Therefore, the clothes 2 or bag 3 can be clean after the bulletproof cloth 15 is taken out, which not only has the characteristics of easy dismantling, washing and assembling but can improve the convenience of use and cleaning by carrying out the cleaning after the bulletproof cloth 15 is taken out to reduce the entire weight.

To sum up, the reinforced fabric not only can block the penetrating impact of a bullet but effectively block the slashing and stabbing of a weapon so as to protect a wearer's personal safety. Moreover, the inner lining cloth and outer lining cloth also provide better softness and touch, more improving the wearing comfort.

I claim:

1. A reinforced fabric, used in the making of clothes and bags and comprising an inner lining cloth, protective cloth arranged on one side of said inner lining cloth, outer lining cloth arranged on one side of said protective cloth opposite to said inner lining cloth, and bulletproof cloth arranged between said protective cloth and said outer lining cloth, wherein an accommodation space just for the configuration of said bulletproof cloth is formed between said protective cloth and said outer lining cloth, and the density of said protective cloth is equal to or larger than 1.3 g/cm$^3$, wherein said protective cloth is attached to the one side of said inner lining cloth with a layer of adhering glue; and wherein said protective cloth that is attached to said inner lining cloth with said adhering glue is at least partly spaced from said outer lining cloth to define said accommodation space therebetween and said bulletproof cloth is removably received in said accommodation space to be located between said protective cloth and said outer lining cloth.

2. The reinforced fabric according to claim 1, wherein peripheries of said inner lining cloth and said outer lining cloth are provided with an openable fixing element therebetween, wherein said openable fixing element is openable to form an opening between the peripheries of said inner lining cloth and said outer lining cloth in communication with said accommodation space for selective entry and removal of said bulletproof cloth into and out of said accommodation space.

3. The reinforced fabric according to claim 2, wherein said fixing element is a zipper, Velcro tap or snap fastener.

4. The reinforced fabric according to claim 1, wherein positions of said bulletproof cloth and said protective cloth corresponding to each other are respectively provided with a buckling piece, wherein said bulletproof cloth and said protective cloth are releasably combinable with each other and thus positioned by means of the buckling piece.

5. The reinforced fabric according to claim 2, wherein positions of said bulletproof cloth and said outer lining cloth corresponding to each other are respectively provided with a buckling piece, wherein said bulletproof cloth and said outer lining cloth are releasably combinable with each other and thus positioned by means of the buckling piece.

6. The reinforced fabric according to claim 1, wherein said bulletproof cloth is formed by combining 13 layers of a first Kevlar material having first hardness with 17 layers of a second Kevlar material having second hardness lower than the first hardness.

7. The reinforced fabric according to claim 1, wherein said bulletproof cloth is formed by combining 17 layers of a first Kevlar material having first hardness with 10 layers of a second Kevlar material having second hardness lower than the first hardness.

8. The reinforced fabric according to claim 4, wherein said buckling piece is a zipper, Velcro tap or snap fastener.

9. The reinforced fabric according to claim 5, wherein said buckling piece is a zipper, Velcro tap or snap fastener.

* * * * *